(12) United States Patent
Levin

(10) Patent No.: US 8,282,837 B2
(45) Date of Patent: *Oct. 9, 2012

(54) METHOD AND SYSTEM OF DESTRUCTION OF VOLATILE COMPOUNDS IN WASTEWATER

(75) Inventor: Alexander Levin, Binyamina (IL)

(73) Assignee: Elcon Recycling Center (2003) Ltd., Haifa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 12/779,183

(22) Filed: May 13, 2010

(65) Prior Publication Data

US 2010/0219132 A1    Sep. 2, 2010

Related U.S. Application Data

(63) Continuation of application No. 12/289,968, filed on Nov. 7, 2008, now Pat. No. 7,722,775, which is a continuation of application No. 11/073,475, filed on Mar. 7, 2005, now Pat. No. 7,455,781.

(51) Int. Cl.
| | |
|---|---|
| B01D 53/34 | (2006.01) |
| B01D 53/86 | (2006.01) |
| C02F 1/02 | (2006.01) |
| C02F 1/20 | (2006.01) |
| C02F 1/28 | (2006.01) |

(52) U.S. Cl. ........ 210/758; 210/664; 210/175; 210/180; 210/202; 210/774; 95/263; 95/253; 95/243; 96/121; 96/130; 96/132; 96/231; 422/168; 422/169; 422/171; 422/173

(58) Field of Classification Search ............. 210/748.11, 210/749, 758, 175, 180, 202, 205, 195.1, 210/259, 774, 806, 603, 607, 664, 634, 639, 210/669, 284, 280, 150, 177; 95/263, 253, 95/279, 153, 245; 422/169, 168, 171, 173; 96/132, 121, 130, 155, 181, 231; 423/210, 240 R See application file for complete search history.

(56) References Cited

U.S. PATENT DOCUMENTS 2,119,721 A    6/1938    Richardson
(Continued)

FOREIGN PATENT DOCUMENTS

DE    4114386    11/1992
(Continued)

OTHER PUBLICATIONS

Communication Pursuant to Article 94(3) EPC Dated Jul. 24, 2009 From the European Patent Office Re.: Application No. 06780452.6.
(Continued)

*Primary Examiner* — Joseph Drodge
*Assistant Examiner* — Cameron J Allen

(57) ABSTRACT

The invention proposes a method of destruction of volatile organic and inorganic compounds in wastewater, this method includes following stages: stripping the aforementioned volatile compounds in a stripping-chemisorption column; preliminary heating the gaseous medium containing these volatile compounds in a first heat regenerator; thermal, flare or thermo-catalytic oxidation of the volatile compounds in circulating gaseous medium; cooling the gaseous medium in a second heat regenerator; chemisorption of acidic gases from the gaseous medium in the stripping-chemisorption column with stripping at the same time additional amount of the volatile compounds from the wastewater. After specific period, direction of the gaseous medium flow is alternated. The proposed method can be executed at elevated temperature. The invention includes as well systems realizing the proposed method.

38 Claims, 5 Drawing Sheets

U.S. PATENT DOCUMENTS

| | | | |
|---|---|---|---|
| 4,594,131 A | | 6/1986 | Maier |
| 4,898,107 A | * | 2/1990 | Dickinson .................... 110/346 |
| 5,589,142 A | | 12/1996 | Gribbon |
| 5,955,037 A | | 9/1999 | Holst et al. |
| 6,504,051 B1 | * | 1/2003 | Miller et al. .................. 562/409 |
| 6,878,188 B2 | | 4/2005 | Yi |
| 7,214,349 B2 | * | 5/2007 | Holst et al. ................... 422/169 |
| 7,455,781 B2 | | 11/2008 | Levin |
| 7,771,514 B1 | * | 8/2010 | Johnsgard et al. .............. 95/149 |
| 2006/0196358 A1 | | 9/2006 | Levin |
| 2009/0057229 A1 | | 3/2009 | Levin |

FOREIGN PATENT DOCUMENTS

| | | |
|---|---|---|
| EP | 0354656 | 2/1990 |
| WO | WO 2008/026196 | 3/2008 |

OTHER PUBLICATIONS

International Search Report Dated Jan. 18, 2008 From the International Searching Authority Re.: Application No. PCT/IL2006/001016.
Notice of Allowance Dated Jan. 13, 2010 From the US Patent and Trademark Office Re.: U.S. Appl. No. 12/289,968.
Official Action Dated Aug. 9, 2007 From the US Patent and Trademark Office Re.: U.S. Appl. No. 11/073,475.
Official Action Dated Apr. 17, 2009 From the US Patent and Trademark Office Re.: U.S. Appl. No. 12/298,968.
Written Opinion Dated Jan. 18, 2008 From the International Searching Authority Re.: Application No. PCT/IL2006/001016.
Communication Pursuant to Article 94(3) EPC Dated Apr. 18, 2012 From the European Patent Office Re.: Application No. 06780452.6.

* cited by examiner

1

METHOD AND SYSTEM OF DESTRUCTION OF VOLATILE COMPOUNDS IN WASTEWATER

RELATED APPLICATIONS

This application is a continuation of pending U.S. patent application Ser. No. 12/289,968, filed on Nov. 7, 2008, which is a continuation of U.S. patent application Ser. No. 11/073,475, filed on Mar. 7, 2005, now U.S. Pat. No. 7,455,781, issued on Nov. 25, 2008, the contents of which are incorporated herein by reference.

CROSS-REFERENCE APPLICATION

Not Applicable

FEDERALLY SPONSORED RESEARCH OF DEVELOPMENT

Not Applicable

BACKGROUND OF THE INVENTION

The problem of treatment of wastewater contaminated with volatile organic or inorganic compounds becomes very pressing for many facilities and for many branches of industry. In some cases, volatile organic and inorganic compounds present a major contributor to overall pollution in a facility.

There are different methods of volatile organic and inorganic compounds control in wastewater.

Detailed review of these methods is presented in the article: Victor H. Edwards "VOC-Control Options During Wastewater Treatment" CHEMICAL ENGINEERING, September 2000, pp. 105÷108.

According to this article, all methods of control of volatile organic and inorganic compounds in wastewater can be classified under two main types: 1) with transfer of volatile organic and inorganic compounds from wastewater into vapor phase by distillation, air stripping, steam stripping, inert-gas stripping, fuel-gas stripping, vacuum distillation and vacuum stripping; 2) with transfer of volatile organic and inorganic compounds into a liquid or solid phase: solvent extraction, liquid ion exchange, reverse osmosis, adsorption, ion exchange and precipitation.

Each aforementioned method is distinguished by its advantages and drawbacks.

In the case of application of air stripping related to the first group, this method should be combined with an additional method for treating air laden with volatile organic and inorganic compounds. There are several physicochemical methods of such additional treatment: flare, feed to a furnace or boiler, feed in a thermal or catalytic incinerator, condensation, cryogenic condensation, adsorption using activated carbon, alumina or zeolites.

Each of these additional methods has in turn several advantages and disadvantage related to its cost, efficiency, reliability and safety. As it is known from technical literature (see, for example, "THERMAL AND THERMO-CATALYTIC TREATMENT OF WASTE GASES" Naukova Dumka, 1984, pp. 17÷22 (in Russian)), thermal method of oxidation of waste gases requires about of 26÷45 kg of liquid fuel per 1000 $m^3$ of waste gases and the thermo-catalytic method—15÷25 kg of liquid fuel correspondingly. It is clear, that higher concentration of volatile organic and inorganic compounds in the volatile organic and inorganic compounds-laden air after the air stripping process causes diminishment of a liquid or gaseous fuel required for thermal or thermo-catalytic oxidation of volatile organic and inorganic compounds presented in the wastewater.

In order to achieve higher concentration of volatile organic and inorganic compounds in the volatile organic and inorganic compounds-laden air it is possible to perform the air stripping process with a stage of previous heating wastewater in a heat exchanging unit, it allows achieving higher concentration of volatile organic and inorganic compounds in air after stripping process and, on the other hand, to treat wastewater containing volatile organic compounds with relatively high temperature of boiling at the atmospheric pressure.

In addition, the rate of stripping at elevated temperature is substantially higher, i.e. for the same size of an air-stripping tower, it is possible to treat greater amount of wastewater in the same period.

However, the common process of air stripping at elevated temperature is characterized by great heat losses at the expense of enhanced water evaporation into the volatile organic and inorganic compounds-laden air. As a result, energy cost for wastewater treatment by air stripping at elevated temperatures is very high.

BRIEF SUMMARY OF THE INVENTION

A proposed technical solution is based on the stripping-chemisorption process performed mainly at elevated temperature.

A system of treatment of volatile organic and inorganic compounds contained in wastewater comprises some main units: a tank filled with the wastewater; two stripping-chemisorption columns installed on the tank through two connecting branches; two fans or blowers causing circulation of the gaseous medium through the system with periodical alternation of circulation direction; two heat regenerators that operate in opposite phases with periodical alternation their modes; a unit of thermal, flare or thermo-catalytic oxidation of volatile organic and inorganic substances contained in the circulating gaseous medium.

The wastewater in tank has alkali reaction (pH>7); it can be achieved by addition of alkali substances into the wastewater. This serves for chemisorption of acidic gases obtained by thermal, flare or thermo-catalytic oxidation of the organic or/and inorganic compounds evaporated previously in the stripping-chemisorption columns. The system is provided with an inlet connection for oxygen delivery and with an outlet connection for blowing out the system, especially, at the initial stage of its operation.

The unit of thermal, flare or thereto-catalytic oxidation (incineration) of volatile organic and inorganic compounds contained in the gaseous medium can be designed in flare, thermal or thermo-catalytic forms.

A circulation pump associated with the tank performs supply of the wastewater from this tank to the upper section(s) of the stripping-chemisorption column(s), which are installed on the tank through the aforementioned connecting branches.

The upper edges of the stripping-chemisorption columns are joined in turn with the bottoms of fixed packed beds (heat regenerators) serving for periodic accumulation of heat from the gaseous medium after flare, thermal or thermo-catalytic oxidation of volatile organic and inorganic compounds contained in this gaseous medium and its preheating before their flare, thermal or thermo-catalytic oxidation. The upper edges of these fixed packed beds (heat regenerators) are communicating with a unit of flare, thermal or thermo-catalytic oxidation.

Besides, in the case of thermo-catalytic oxidation, there are two modules of ultimate heating situated between the unit of flare, thermal or thereto-catalytic oxidation and the heat regenerators.

Both connecting branches, which are installed on the tank, are joined by two parallel channels, which are provided with demisters and shutters installed in their extreme sections; the fans are installed in these channels and actuated alternatively in accordance with modes of the heat regenerators, they cause circulation of the gaseous medium through the entire system. The basic processes in the entire system include: stripping-chemisorption by the stripping-chemisorption columns, pre-heating the gaseous medium by, one of the heat regenerators, thermal, flare or thermo-catalytic oxidation in the thermal or thermo-catalytic oxidation unit, and heat accumulation in the other heat regenerator.

There are two tubular branches inserting from the lower edges of the connecting branches into the wastewater in the tank, it allows to prevent bypass flow of the gaseous medium via the upper space of the tank (if this tank is not filled completely with the wastewater).

In the case of thermal oxidation of volatile organic and inorganic compounds in the circulating gaseous medium, it is possible to design the heat regenerators and the thermal oxidation unit as a combined module in the form of a tube from refractory material with an internal packing; the middle section of the tube is provided with a heating means (electrical or flare) and the extreme sections of this refractory tube with the internal packing serve as the heat regenerators.

In another version, the fans are installed between the stripping-chemisorption column and the heat regenerators. In this version, the stripping-chemisorption columns are installed directly on the tank with wastewater (without application of the connecting branches) and the aforementioned tubular branches inserted in the space of the wastewater tank are not applied. The upper internal section of the tank, which is not filled with the wastewater, serves in this case for circulation of the gaseous medium and the aforementioned parallel channels are not applied as well.

The tank can be provided with a build-in or external heat-exchanging module.

In addition, the proposed system is provided with proper control equipment and valves.

The proposed system, when it is designed for thermo-catalytic oxidation of volatile organic and inorganic compounds, operates in the following manner:

the tank should be filled with wastewater contaminated with volatile organic and inorganic compounds;

if it is necessary, the wastewater temperature in the tanks is established at a level, which is required for rapid and safety stripping volatile organic and inorganic compounds with their following oxidation in gaseous medium;

alkalinity of this wastewater in the tanks can be established previously or in the process of oxidation of volatile organic and inorganic compounds at a level, which ensures complete neutralization and chemisorption of acidic gases obtained as the result of oxidation of these volatile organic and inorganic compounds;

the circulation pump is actuated and it supplies the wastewater from the tank into one or both stripping-chemisorption columns; if it is necessary, the wastewater temperature in this tank is established by its heat-exchanging module;

at the same time, one of fans is actuated in such a way, that it causes circulation of the gaseous medium in the entire system when this gaseous medium flows co-currently or counter-currently regarding the wastewater flow in the operating stripping-chemisorption columns;

after preheating the gaseous medium in one fixed packed bed (heat regenerator) and its ultimate heating by the electrical heater in the module of ultimate heating the gaseous medium passes through the catalytic bed, and volatile organic and inorganic compounds contained in the gaseous medium are oxidized by oxygen presented in the gaseous medium;

then the gaseous medium is pre-cooled in the opposite heat regenerator;

oxygen or air is steadily supplied into the gaseous medium in accordance with amount of oxygen which is run out for oxidation of volatile organic and inorganic compounds in the gaseous medium.

Finally cooling is performed in the following operating stripping-chemisorption column(s) itself. Besides, this operating stripping-chemisorption column provides additional evaporated portions of volatile organic and inorganic compounds into the circulating gaseous medium, causes absorption of the oxidation products in the wastewater and regulates the water vapors' content in the gaseous medium.

As the average temperature in the heat regenerator, which serves at this point for cooling the gaseous medium after the unit of thermo-catalytic oxidation, is elevated up to a certain level, operation of the fans is alternated, i.e. the first fan will be in its idle state and the second fan begins to circulate the gaseous medium through the system in opposite direction. As this takes place, the second module of ultimate heating is actuated instead of the first module.

After getting sufficiently low concentration of volatile organic and inorganic compounds in the wastewater, the process is finished and the wastewater is discharged from the tank.

In order to indicate temperature change and volatile organic and inorganic compounds' concentration in the wastewater or in the gaseous medium, the system is provided with a proper monitoring unit.

It is possible to simplify the system described above by introduction of four shutoff dampers. In this case, there is only one stripping-chemisorption column. Closing and opening the diagonally positioned pairs of the shutoff dampers can alternate direction of the gaseous medium flow via the aforementioned fixed packed beds.

Two modules of ultimate heating and one module of thermo-catalytic oxidation are positioned between these fixed packed beds (heat regenerators), the modules of ultimate heating are energized alternatively in accordance with direction of the gaseous stream. This version gives possibility to apply only one fan.

If wastewater contains volatile organic acid, for example—acetic acid, than stripping and chemosorption processes should be performed in different columns connected in series, because high alkalinity may significantly diminish volatility of this acid. In this case chemisorption of the gases obtained by thermo-oxidation or thermo-catalytic oxidation is performed in a separate column by alkaline solution.

The stripping-chemisorption columns can be of the spray or packed types.

In the case of flare or thermal oxidation, the modules of ultimate heating are not applied.

The heat exchanging module(s) of the tank(s) allows to change temperature of the wastewater in the tank in order to establish sufficiently high rate of evaporation of volatile organic and inorganic compounds and, on the other hand, to prevent danger of explosion of the gaseous medium.

In the case of flare or thermal oxidation of volatile organic and inorganic compound-laden gaseous medium there is only one module of ultimate heating (or incineration) and oxidation is performed in this module.

The proposed design of the stripping-chemisorption-oxidation system allows diminishing consumption of electrical energy, liquid or gaseous fuel for flare, thermal or thermo-catalytic oxidation of volatile organic and inorganic compounds contained in wastewater. This diminishment can be estimated by a factor of 2-4.

In the case, when the wastewater contains high concentration of volatile organic and inorganic compounds, it is possible to diminish further this energy expenditure at the cost of the heat released in the process of volatile organic and inorganic compound oxidation.

In the batch version of the process, the temperature of the wastewater is changed during the process of stripping-chemisorption in such a way, that concentration of explosive volatile organic and inorganic compounds in the gaseous medium in the system is significantly lower than a dangerous level, which can cause explosion. In addition, it is possible to cool the wastewater in the tanks at the early stage of oxidation in order to prevent danger of explosion (in the case of high initial concentration of volatile organic and inorganic compounds in the wastewater).

In the continuous version of the process, there are some stripping-chemisorption-oxidation sub-units, which are arranged in line and the temperature of the wastewater is gradually elevated in the direction from the first stripping-chemisorption-oxidation sub-unit to the latter. In such a way, concentration of volatile organic and inorganic compounds in the gaseous medium of each stripping-chemisorption-oxidation sub-unit is lower than the dangerous level because gradually diminishment of volatile organic and inorganic compound concentration in the stripping-chemisorption-oxidation sub-units according to downstream of the wastewater.

The main area of application of the proposed systems is treatment of wastewaters of different facilities.

However, these systems can be used as well for treatment of groundwater in the case, when this groundwater has high level of contamination by volatile organic and inorganic compounds (for example, in the case of spillage at a facility).

In addition the proposed system can be used for incineration of water-insoluble organic liquids, for example, waste PCB. In this case, the tank(s) of the system is filled with the waste organic liquid and aqueous alkali solution in a required proportion. The tank is provided with a mixer, which generates emulsion of both components (the aqueous alkali solution and the organic liquid), this emulsion is supplied by the circulation pump to the stripping-chemisorption column.

DETAILED DESCRIPTION OF THE INVENTION

Figure 1:
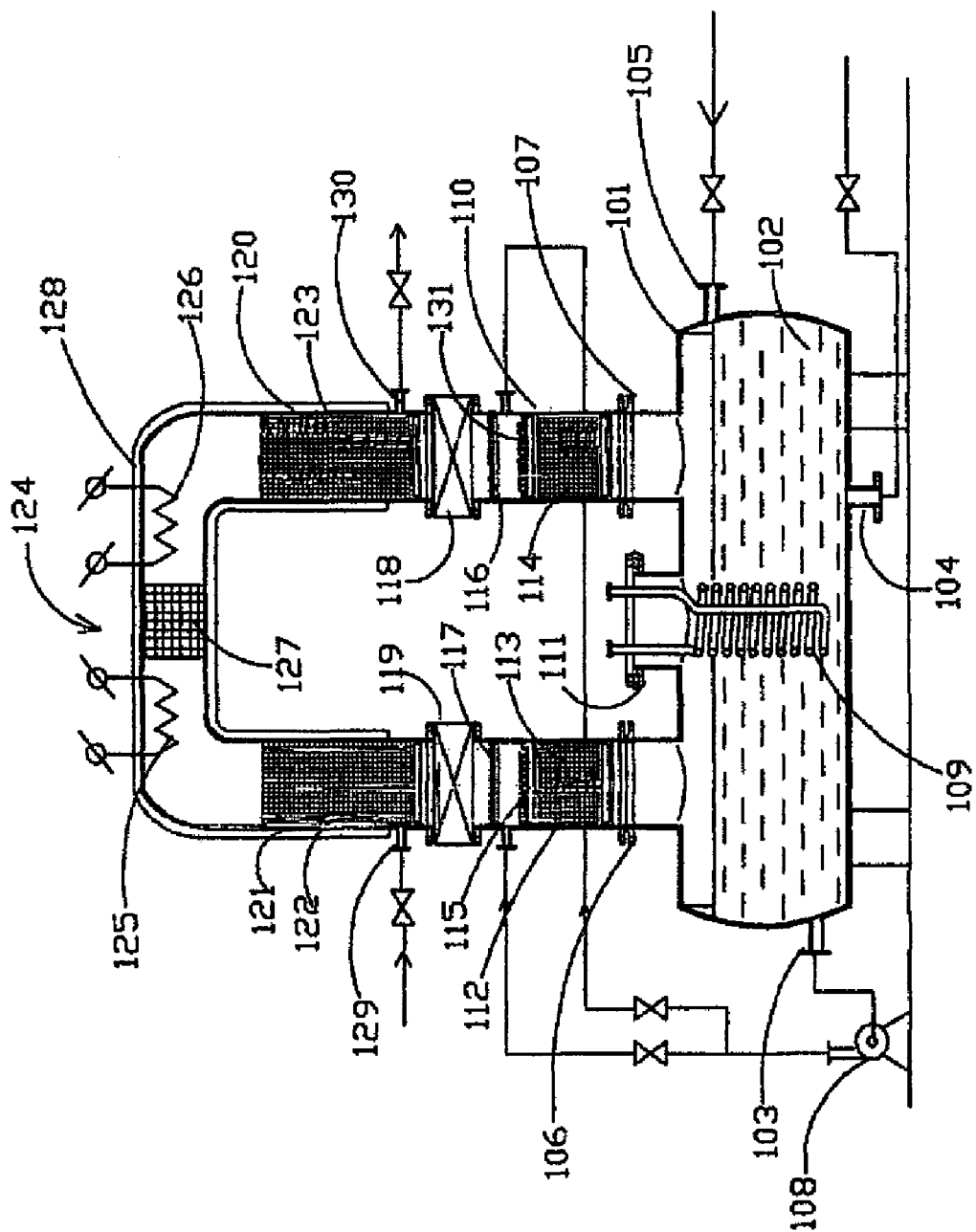
FIG. 1 is a general scheme of a system for destruction of volatile organic and inorganic compounds contained in wastewater, this scheme includes a tank with a circulating pump and two stripping-chemisorption columns; oxidation of volatile organic and inorganic compounds is performed by a thermo-catalytic unit.

FIG. 1 shows a general scheme of a batch system for destruction of volatile organic and inorganic compounds contained in wastewater by thermo-catalytic oxidation.

This scheme includes tank 101 filled with wastewater 102 in such a way, that there is a free upper space intended for circulation of the gaseous medium. The tank comprises: outlet connections 104 and 103, an inlet connection 105, flanges 106 and 107 for installation of stripping-chemisorption columns 110 and 112, a built-in heat exchanging module 109. This heat exchanging module is installed on an additional flange 111. The stripping-chemisorption columns 110 and 112 comprise packings 113 and 114, distributors 115 and 131, demisters 117 and 116. A circulation pump 108 performs circulation the wastewater via the stripping-chemisorption columns 110 and 112. Fans 118 and 119 are installed on the upper flanges of the stripping-chemisorption columns 110 and 112.

In addition, there are two heat regenerators 120 and 121 installed by their lower flanges on fans 118 and 119. The heat regenerator 120 is provided with an inlet connection 129 for oxygen delivery and the heat regenerator 121—with an outlet connection 130 for purging the entire system.

The heat regenerator 120 is filled with packing 122, and heat regenerator 121—with packing 123.

Module 124 for thermo-catalytic oxidation consists of two sub-modules 125 and 126 of ultimate heating, and a catalytic packed bed 127.

The heat regenerators 120, 121 and module 124 are provided with a thermal insulation 128.

Figure 2:
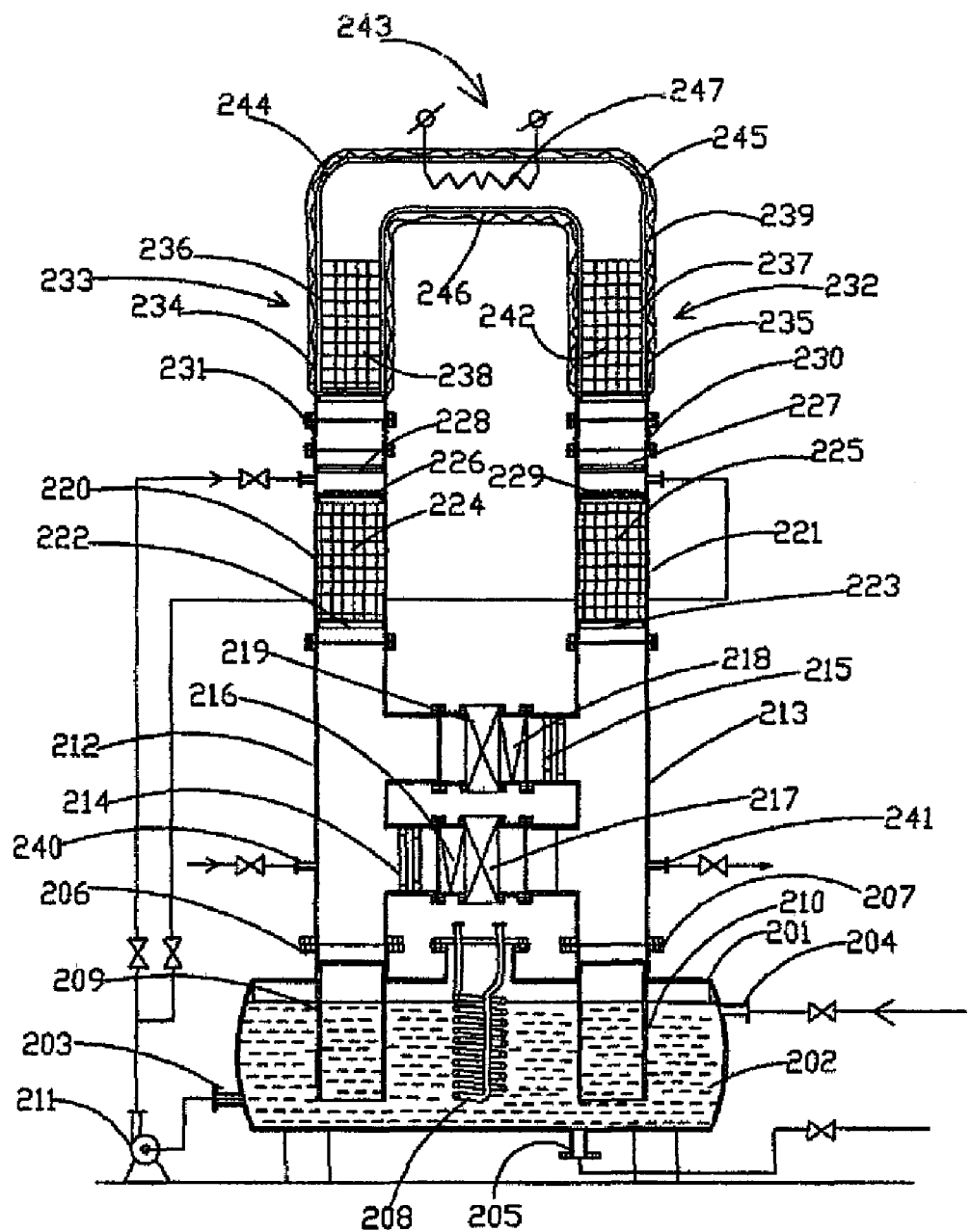
FIG. 2 is a general scheme of a system for destruction of volatile organic and inorganic compounds contained in wastewater, this system includes a tank with a circulating pump and two stripping-chemisorption columns, oxidation of volatile organic and inorganic compounds is performed by a thermal unit.

FIG. 2 shows a general scheme of a batch system for destruction of volatile organic and inorganic compounds contained in wastewater by thermal oxidation. This scheme includes tank 201 filled with wastewater 202. Tank 201 is provided with an inlet connection 204, outlet connections 203 and 204, flanges 206 and 207 for installation of two connecting branches 212 and 213. Each connecting branch is provided with two lateral tees.

In addition, tank 201 is provided with a built-in heat exchanging module 208. Tubular branches 209 and 210 are installed on flanges 206 and 207. They are immersed into the wastewater; it prevents bypass flow of the gaseous medium through the upper space of the tank.

The connecting branch 212 is provided with an inlet connection 240 for oxygen delivery, and the connecting branch 213—with an outlet connection 241 for purging the entire system. The lateral tees of the connecting branches are joined by two joints; there are demisters 214 and 215, fans 217 and 219, back draft shutters 216 and 218, which are installed in these joints.

The upper flanges of the connecting branches 212 and 213 serve for installation of two stripping-chemisorption columns 220 and 221 with supporting grids 222 and 223, and packings 224 and 225.

In addition, there are distributors 226, 229 and demisters 228, 227 installed in the stripping-chemisorption columns. Pump 211 performs supply of the wastewater into the stripping-chemisorption columns.

The upper flanges of the stripping-chemisorption columns serve for installation of their associated heat regenerators 233, 232 with packings 238 and 242. This installation is performed through two bellow joints 222 and 223.

The low sections of the heat regenerators consist off metal branches 234 and 235; refractory tubes 236 and 237 are inserted into these metal branches. These refractory tubes are joined by refractory elbows 244 and 245 with module 243 of thermal oxidation; this module comprises a refractory tube 246 and an internal electrical heater 243.

The heat regenerators 232, 233 and module 243 of thermal oxidation are provided with a thermal insulation 239.

Figure 3:
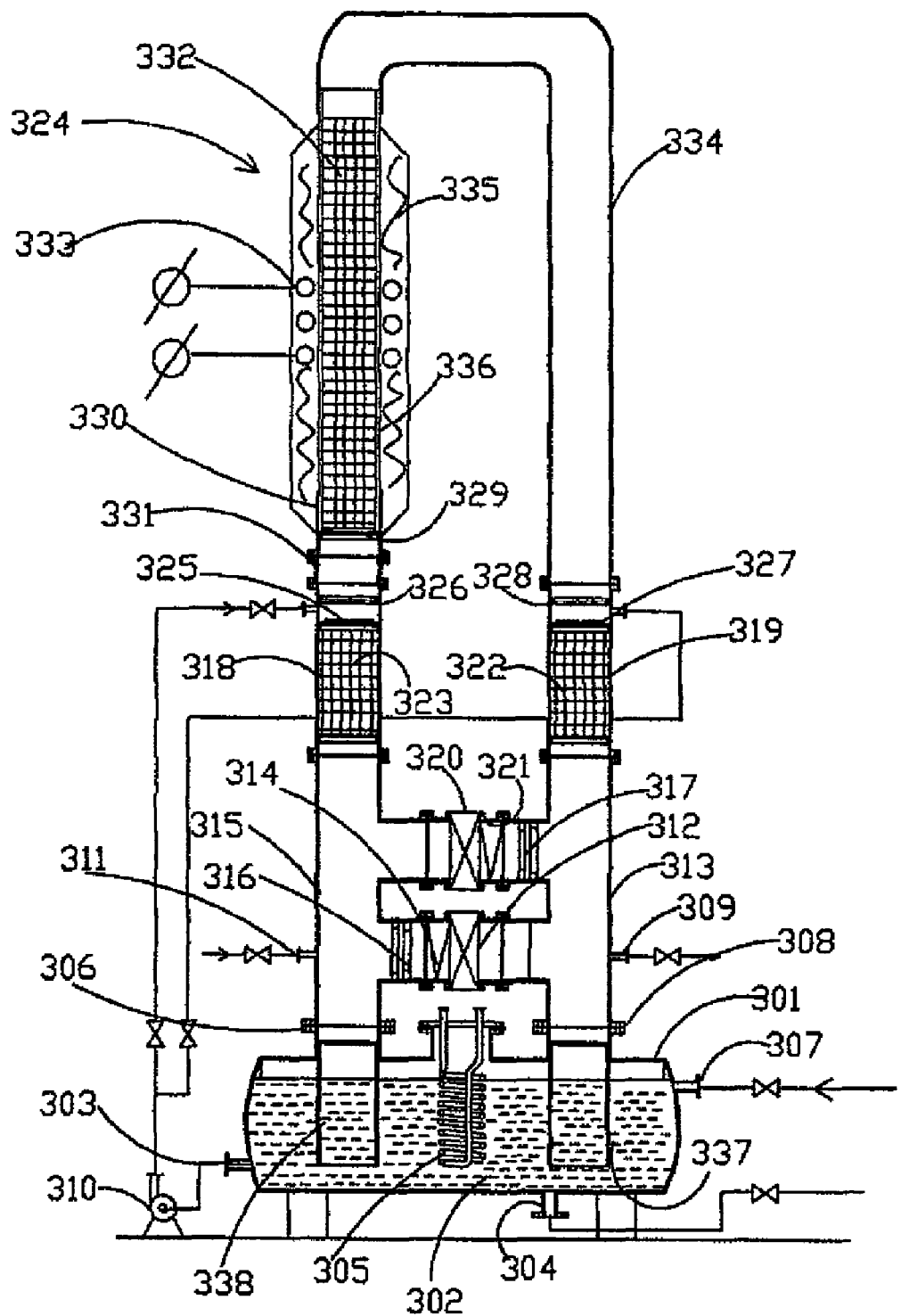
FIG. 3 is a general scheme of a system for destruction of volatile organic and inorganic compounds contained in wastewater, this system is based on thermal oxidation of volatile organic and inorganic compounds; the heat regenerators and the thermal oxidation unit are designed as one combined module.

FIG. 3 shows a general scheme of a batch system for destruction of volatile organic and inorganic compounds contained in wastewater a plant of volatile organic and inorganic compound-control in wastewater, this scheme is based on thermal oxidation of volatile organic and inorganic compounds; the heat regenerators and the unit of thermal oxidation are designed as one combined module of tubular form.

This scheme includes tank 301 filled with wastewater 302. Tank 301 is provided with an inlet connection 304, outlet connections 303 and 307, flanges 306 and 308 for installation two connecting branches 313 and 315. Each connecting branch is provided with two lateral tees.

In addition, tank 301 is provided with a built-in heat exchanging module 305. Tubular branches 337 and 338 are installed on flanges 306 and 308. They are immersed into the wastewater, it prevents bypass flow of the gaseous medium through the upper space of the tank.

The connecting branch 315 is provided with an inlet connection 311 for oxygen delivery, and the connecting branch 313—with an outlet connection 309 for purging the entire system. The lateral tees of the connecting branches are joined by two joints; there are demisters 316 and 317, fans 312 and 320, back draft shutters 314 and 321, which are installed in these joints.

The upper flanges of the connecting branches 313 and 315 serve for installation of two stripping-chemisorption columns 318 and 319 with packings 323 and 322.

In addition, there are distributors 325, 327 and demisters 326, 328 installed in the stripping-chemisorption columns. Pump 310 performs supply of the wastewater into the stripping-chemisorption columns.

The upper flange of the stripping-chemisorption column 315 serves for installation a bellow joint 331, which in turn serves for installation of a combined module 324 of heat regeneration—thermal oxidation.

The low section of the combined module 324 consists off a metal branch 330 with supporting grid 329; a refractory tube 336 is inserted into this metal branch. The refractory tube 336 is filled with packing 332.

The middle section of the refractory tube 336 is provided with an external electrical heater 333, and its lower and upper sections serve as heat regenerators. The refractory tube 336 is provided with a thermal insulation 335.

A gas duct 334 communicates the upper section of the combined module 324 with the upper flange of the stripping-chemisorption column 319.

Figure 4:
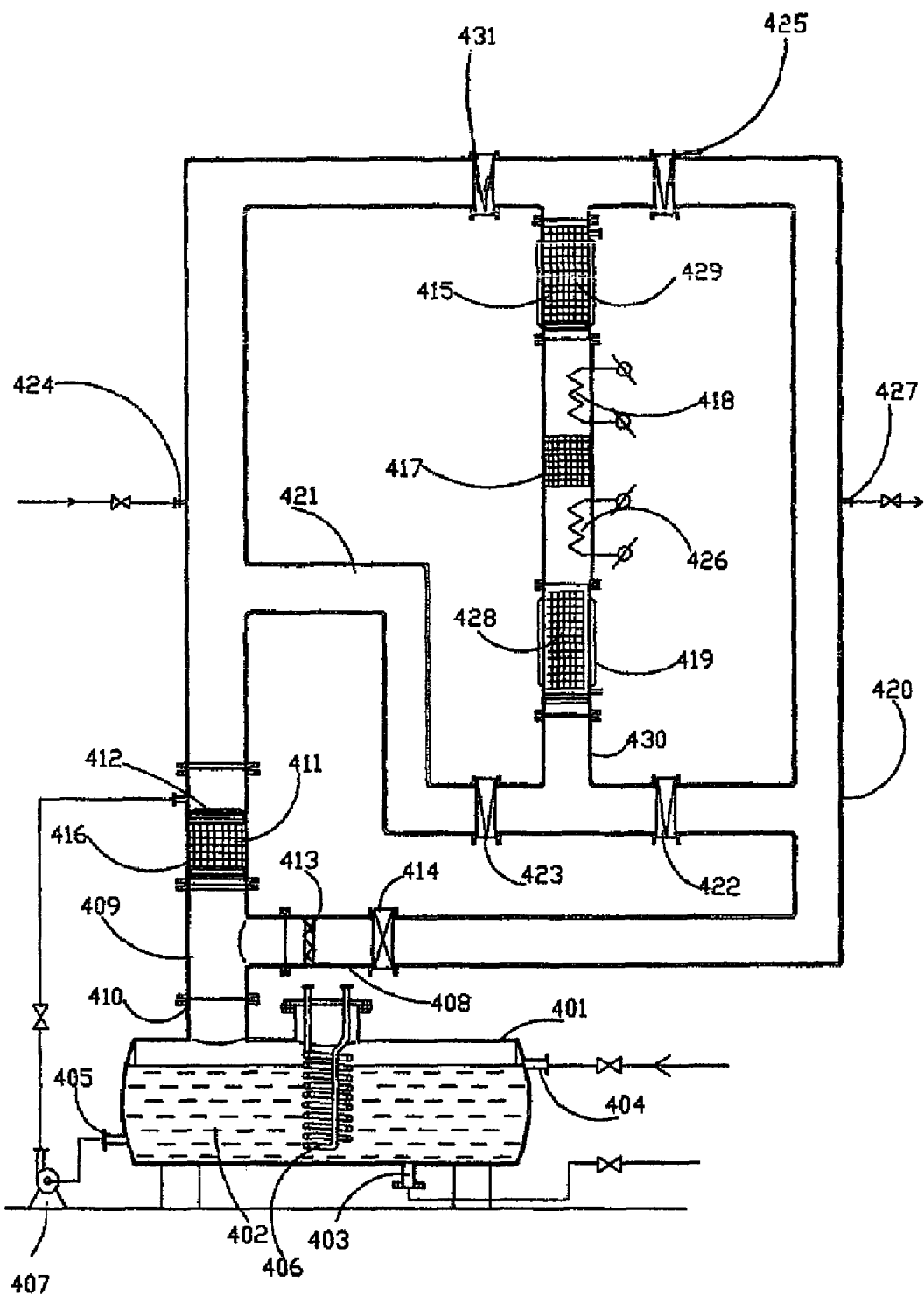
FIG. 4 is a general scheme of a system for destruction of volatile organic and inorganic compounds contained in wastewater by thermo-catalytic oxidation; this system comprises one stripping-chemisorption column and one fan.

FIG. 4 shows a general scheme of a plant of volatile organic and inorganic compound-control in wastewater by thermo-catalytic oxidation with one stripping-chemisorption column.

This scheme includes tank 401 filled with wastewater 402. The tank comprises: outlet connections 404 and 403, an inlet connection 405, flange 410 and a built-in heat exchanging module 406. Flange 410 serves for installation of a connecting branch 409 with a lateral tee.

A stripping-chemisorption column 416 is installed on the upper flange of the connecting branch 409, this column comprises packing 411 and distributor 412.

A circulation pump 407 performs circulation the wastewater via the stripping-chemisorption column 416.

The lateral tee of the connecting branch 409 is joined with the proximal edge of a gas duct 420; the distal edge of this gas duct is joined with the upper flange of the stripping-chemisorption column 416. In such a way, these units—the gas duct 420, the stripping-chemisorption column 416 and the connecting branch 409—present a closed loop for circulation of gaseous medium. The proximal section of the gas duct is provided with demister 413 and fan 414.

There is a first additional gas duct 421, which communicates the proximal and distal sections of the gas duct 420. A heat regenerator 419, module 426 of sub-module 426 of ultimate heating, module 417 of thermo-catalytic oxidation, sub-module 418 of ultimate heating, and a heat regenerator 429 are installed in-line on a second additional gas duct 430 communicating the first additional gas duct 421 with the gas duct 420.

Two pair of dampers 431, 425 and 423, 422 are installed on the gas duct 420 and the first additional gas duct 421 from both sides with respect to the second additional gas duct 430. Alternative shutting and opening the diagonally situated dampers gives possibility to alternate periodically direction of the gaseous medium flow via the aforementioned sequence of the modules and sub-modules installed on the second additional gas duct.

Figure 5:
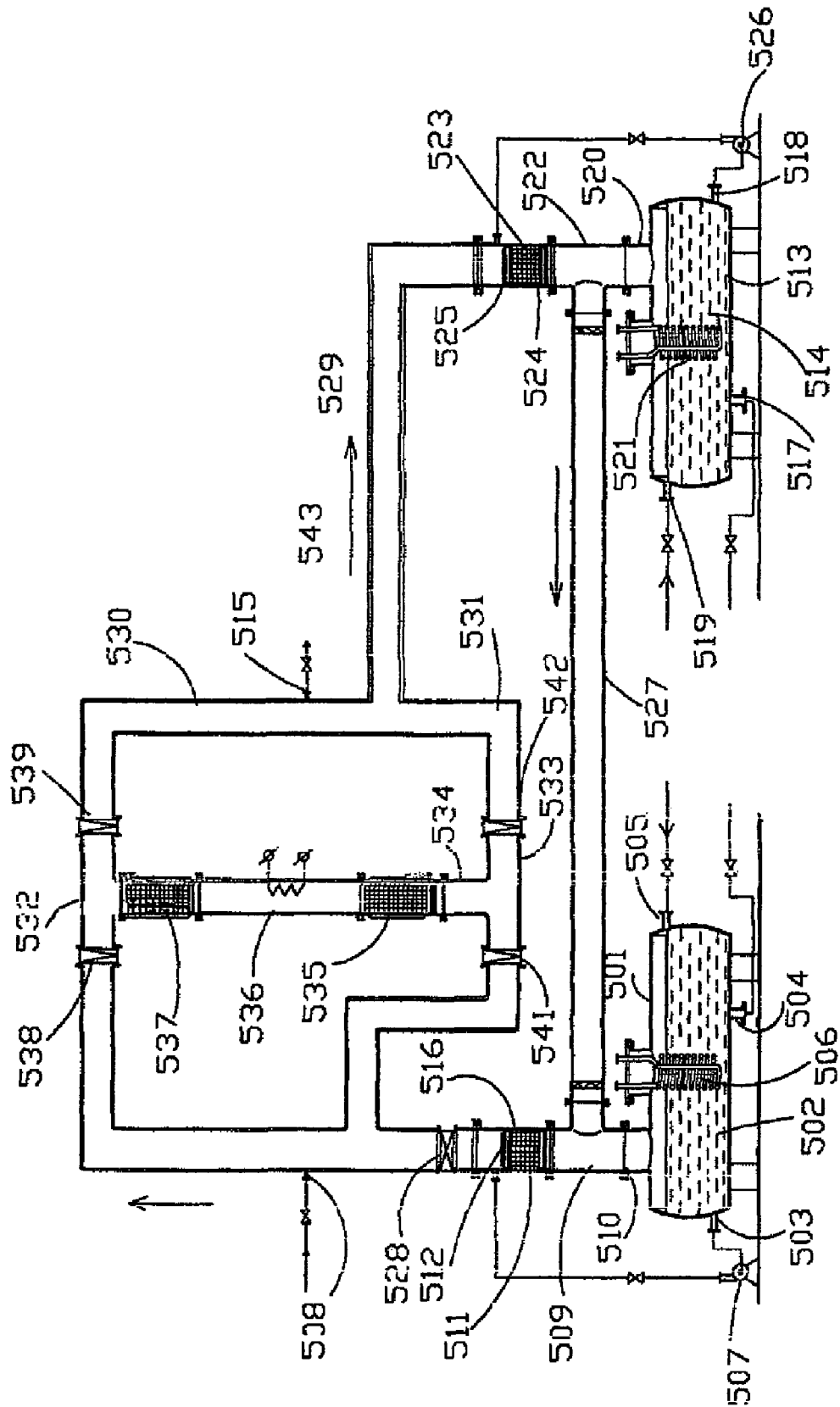
FIG. 5 is a general scheme of a system for destruction of organic acids contained in a wastewater.

FIG. 5 shows a general scheme of a system for destruction of organic acids contained in a wastewater.

This scheme includes tank 501 filled with wastewater 502. The tank comprises: outlet connections 504 and 503, an inlet connection 505, flange 510 and a built-in heat exchanging module 506. Flange 510 serves for installation of a connecting branch 509 with a lateral tee.

A stripping column 516 is installed on the upper flange of the connecting branch 509, this column comprises packing 511 and distributor 512.

A circulation pump 507 performs circulation the wastewater via the stripping column 516. There is a second tank 513 filled with alkaline solution 514. The tank comprises: outlet connections 517 and 518, an inlet connection 519, flange 520 and a built-in heat-exchanging module 521. Flange 520 serves for installation of a connecting branch 522 with a lateral tee.

A chemisorption column 523 is installed on the upper flange of the connecting branch 522, this column, comprises packing 524 and distributor 525.

A circulation pump 526 performs circulation the alkaline solution via the chemisorption column 523.

The lateral tee of the connecting branch 509 is connected with the lateral tee of the connecting branch 522 by a gas duct 527.

The inlet flange of fan 528 is installed on the upper flange of the stripping column 516.

The upper flange of the chemisorption column 523 and the outlet flange of fan 528 are communicated by a gas duct 529 which is branched in two parallel gas ducts 530 and 531. The parallel gas ducts include two T-pieces 532 and 533. The central branches of these T-pieces are communicated via a gas duct 534, which incorporates a first heat regenerating bed 535, an electrical heater 536 and a second heat regenerating bed 537; these units are positioned sequentially.

The system is provided with an inlet connection 508 for supply of oxygen and/or other gases into the gaseous circuit of this system, and with an outlet connection 515 for blow-out of the excessive gases from the system.

Two pairs of dampers 538, 539 and 540, 541 are installed on the gas ducts 530 and 531 from the both sides of the central branches of T-pieces 532 and 533.

Alternative shutting and opening the diagonally situated dampers gives possibility to alternate periodically direction of the gaseous medium flow via the aforementioned sequence of the heat regenerating beds and the electrical heater.

What is claimed is:

1. A system for processing water contaminated with volatile compounds, comprising:
   a stripping unit including a first inlet for contaminated water, a second inlet for a circulating gaseous medium, and an outlet;
   wherein the stripping unit is operative to strip volatile compounds from the contaminated water and into said circulating gaseous medium, and for extraction of oxidation products from said circulating gaseous medium;
   an oxidation unit having an inlet coupled to said stripping unit outlet, to oxidize the volatile compounds stripped into said circulating gaseous medium, and to form oxidation products in said circulating gaseous medium;
   an outlet from said oxidation unit for said circulating gaseous medium carrying said formed oxidation products coupled to the second inlet of said stripping unit; and
   a heat regeneration system to preheat said circulating gaseous medium carrying said stripped volatile compounds entering said oxidation unit from said stripping unit, and to cool said circulating gaseous medium carrying said formed oxidation products exiting said oxidation unit.

2. A system according to claim 1, wherein said heat regeneration system comprises:
   a first and a second heat exchange unit and a heat flow reversal unit,
   wherein the heat flow reversal unit is operative to change a direction of heat flow from a first state in which the first heat exchange unit cools said circulating gaseous medium carrying said formed oxidation products exiting said oxidation unit and the second heat exchange unit preheats said circulating gaseous medium carrying said stripped volatile compounds entering said oxidation unit, to a second state in which the second heat exchange unit cools said circulating gaseous medium carrying said formed oxidation products exiting said oxidation unit and the first heat exchange unit preheats said circulating gaseous medium carrying said stripped volatile compounds entering said oxidation unit.

3. A system according to claim 2, wherein said heat flow reversal unit reverses the flow direction of said circulating gaseous medium carrying said formed oxidation products exiting said oxidation unit and of said circulating gaseous medium carrying said stripped volatile compounds entering said oxidation unit.

4. A system according to claim 3, wherein the heat flow reversal unit includes a blower.

5. A system according to claim 3, wherein the heat flow reversal unit includes a system of shutters.

6. A system according to claim 2, wherein said heat flow reversal unit is responsive to an average temperature in the one of said first or said second heat exchange units then being used for cooling said circulating gaseous medium exiting said oxidation means reaching a certain level.

7. A system according to claim 1, wherein said oxidation unit is a thermal oxidation unit.

8. A system according to claim 1, wherein said oxidation unit is a flare oxidation unit.

9. A system according to claim 1, wherein said oxidation unit is a thermo-catalytic oxidation unit.

10. A system according to claim 1, further comprising a heating unit operative to heat the wastewater before entry thereof into said stripping unit.

11. A system according to claim 1, further comprising an inlet for adding an additional gas to said circulating gaseous medium carrying said stripped volatile compounds entering said oxidation unit from said stripping unit, said additional gas inlet being so located that the additional gas is preheated together with said circulating gaseous medium carrying said stripped volatile compounds entering said oxidation unit.

12. A system according to claim 1, wherein the stripping unit includes a chemisorption bed.

13. A method of processing water contaminated with volatile organic and inorganic compounds, the method comprising:
    delivering the contaminated water and a circulating gaseous medium to a stripping unit;
    stripping the volatile compounds from the contaminated water and into said circulating gaseous medium;
    oxidizing the volatile compounds stripped into said circulating gaseous medium, to form oxidation products in said circulating gaseous medium;
    preheating said circulating gaseous medium before oxidation of the volatile compounds;
    cooling said circulating gaseous medium carrying said formed oxidation products, said preheating and cooling being performed in a heat regeneration system; and
    removing said oxidation products formed in said circulating gaseous medium by said stripping unit.

14. The method of claim 13, wherein the heat regeneration system includes a first and a second heat exchange unit, and
    wherein the method further includes reversing a direction of heat flow from a first state in which the first heat exchange unit cools said circulating gaseous medium carrying said formed oxidation products, and the second heat exchange unit preheats said circulating gaseous medium carrying said stripped volatile compounds before oxidation, to a second state in which the second heat exchange unit cools said circulating gaseous medium carrying said formed oxidation products, and the first heat exchange unit preheats said circulating gaseous medium carrying said stripped volatile compounds before oxidation.

15. A method according to claim 14, wherein the direction of said heat flow is reversed by reversing the flow direction of said circulating gaseous medium.

16. A method according to claim 14, wherein the direction of said heat flow is reversed by a blower.

17. A method according to claim 14, wherein the direction of said heat flow is reversed by a system of shutters.

18. The method of claim 14, wherein the direction of said heat flow is reversed when average temperature is elevated up to a certain level in said first or in said second heat exchange unit being used for cooling said circulating gaseous medium carrying said formed oxidation products.

19. A method according to claim 13 further comprising adding an additional gas into said circulating gaseous medium carrying said stripped volatile products before oxidation, said additional gas being added at a location such that said additional gas is preheated together with said circulating gaseous medium carrying said stripped volatile products.

20. A method according to claim 19, wherein said additional gas includes oxygen.

21. The method of claim 19, wherein the amount of said additional gas added into said circulating gaseous medium is determined in accordance with an amount of oxygen consumed by said oxidation.

22. A method according to claim 13, wherein oxidation products are removed from said circulating gaseous medium by chemisorption.

23. A method according to claim 22, wherein said chemisorption is performed in said stripping unit.

24. A method according to claim 13, wherein said oxidation is performed by thermal oxidation.

25. A method according to claim 13, wherein said oxidation is performed by flare oxidation.

26. A method according to claim 13, wherein said oxidation is performed by thermo-catalytic oxidation.

27. A method according to claim 13, further comprising measuring a concentration of the volatile compounds in said contaminated water or in said circulating gaseous medium after stripping, and/or measuring temperatures in different locations in said circulating gaseous medium.

28. A method according to claim 13, further comprising changing a temperature of the contaminated water before stripping.

29. A method according to claim 28, wherein the temperature of the contaminated water is changed to achieve a desired rate of evaporation of the volatile compounds and, to prevent danger of explosion of said circulating gaseous medium.

30. A method according to claim 27, wherein the temperature of the contaminated water is changed to maintain a concentration of the volatile compounds in said circulating gaseous medium significantly lower than a dangerous level which can cause explosion of said circulating gaseous medium.

31. A method according to claim 13, wherein said contaminated water is delivered to the stripping unit in a continuous stream, and wherein stripping, oxidation, and chemisorption are performed in a plurality of processing subunits, each comprised of a stripping unit, an oxidation unit and a chemisorption unit arranged in series.

32. A method according to claim 31, wherein a temperature of said contaminated water is gradually elevated in a direction starting from first said processing sub-units to maintain a concentration of volatile compounds in the gaseous medium in processing sub-unit lower than a dangerous level.

33. A method according to claim 13, wherein said contaminated water is processed in batches.

34. A method according to claim 13, wherein the contaminated water is preheated in said stripping unit before processing.

35. A method according to claim 13, wherein the stripping unit is operative to strip substantially all volatile compounds from the contaminated water and into said circulating gaseous medium.

36. A system according to claim 1, wherein the contaminated water is preheated in said stripping unit before further processing.

37. A system according to claim 1, wherein the stripping unit is operative to strip substantially all volatile compounds from the contaminated water and into said circulating gaseous medium.

38. A system according to claim 1, wherein heat to preheat said circulating gaseous medium carrying said stripped volatile products entering said oxidation unit from said stripping unit is provided by heat extracted from said circulating gaseous medium carrying said formed oxidation products exiting said oxidation unit.

* * * * *